United States Patent [19]
Drew et al.

[11] Patent Number: 5,836,201
[45] Date of Patent: Nov. 17, 1998

[54] METHODS AND APPARATUS FOR MEASURING THE FLOW RATE OF SOLVENT RECOVERY IN SOLVENT RECOVERY DRYERS.

[75] Inventors: Jodell L. Drew, West Allis; David L. Foshey, Muskego, both of Wis.; Michael D. Johnson, Golden Valley, Minn.

[73] Assignee: Industrial Towel & Uniform, Inc., New Berlin, Wis.

[21] Appl. No.: 847,162

[22] Filed: Apr. 30, 1997

[51] Int. Cl.[6] .............................. G01F 23/00; D06F 33/00
[52] U.S. Cl. ........................ 73/291; 202/164; 137/359; 68/12.08; 68/18 R; 68/12.13; 364/509
[58] Field of Search ............................. 73/291, 296, 302, 73/861.49; 202/164; 137/115.02, 115.03, 87.02, 87.03, 395, 403; 68/12.08, 12.01, 12.02, 18 R, 12.13; 364/509, 510

[56] References Cited

U.S. PATENT DOCUMENTS

| | | | |
|---|---|---|---|
| 3,067,766 | 12/1962 | Connell | 137/395 |
| 4,354,364 | 10/1982 | Holder et al. | 68/18 R |
| 4,386,623 | 6/1983 | Funk et al. | 137/395 |
| 4,401,512 | 8/1983 | Likins, Jr. | 196/132 |
| 4,712,392 | 12/1987 | Hagiwara et al. | 68/18 |
| 4,788,348 | 11/1988 | Ferretti et al. | 73/291 |
| 4,856,343 | 8/1989 | Hon | 73/291 |
| 4,874,472 | 10/1989 | Kohler | 202/169 |
| 4,879,888 | 11/1989 | Suissa | 68/18 |
| 4,885,099 | 12/1989 | Kelly | 210/771 |
| 4,938,845 | 7/1990 | Kohler | 202/169 |
| 4,954,222 | 9/1990 | Durr et al. | 202/176 |
| 4,956,763 | 9/1990 | Stewart et al. | 137/395 |
| 5,053,111 | 10/1991 | Ellerbe, Jr. | 203/1 |
| 5,174,864 | 12/1992 | Arbizzani et al. | 202/175 |
| 5,334,291 | 8/1994 | Gavlin et al. | 202/234 |

Primary Examiner—Elizabeth L. Dougherty
Assistant Examiner—Harshad Patel
Attorney, Agent, or Firm—Michael Best & Friedrich

[57] ABSTRACT

A solvent recovery dryer having a flow sensing device in communication with the output of the solvent recovery dryer. The flow sensing device is in operable communication with a computer and the computer calculates the flow rate of liquid being recovered, and controls the dryer when a certain flow rate is reached. The computer also stores and displays flow rate data. The flow sensing device provides for nearly continuous monitoring of the flow rate, and also provides for accurate monitoring of flow rates at high and low levels of liquid flow.

21 Claims, 1 Drawing Sheet

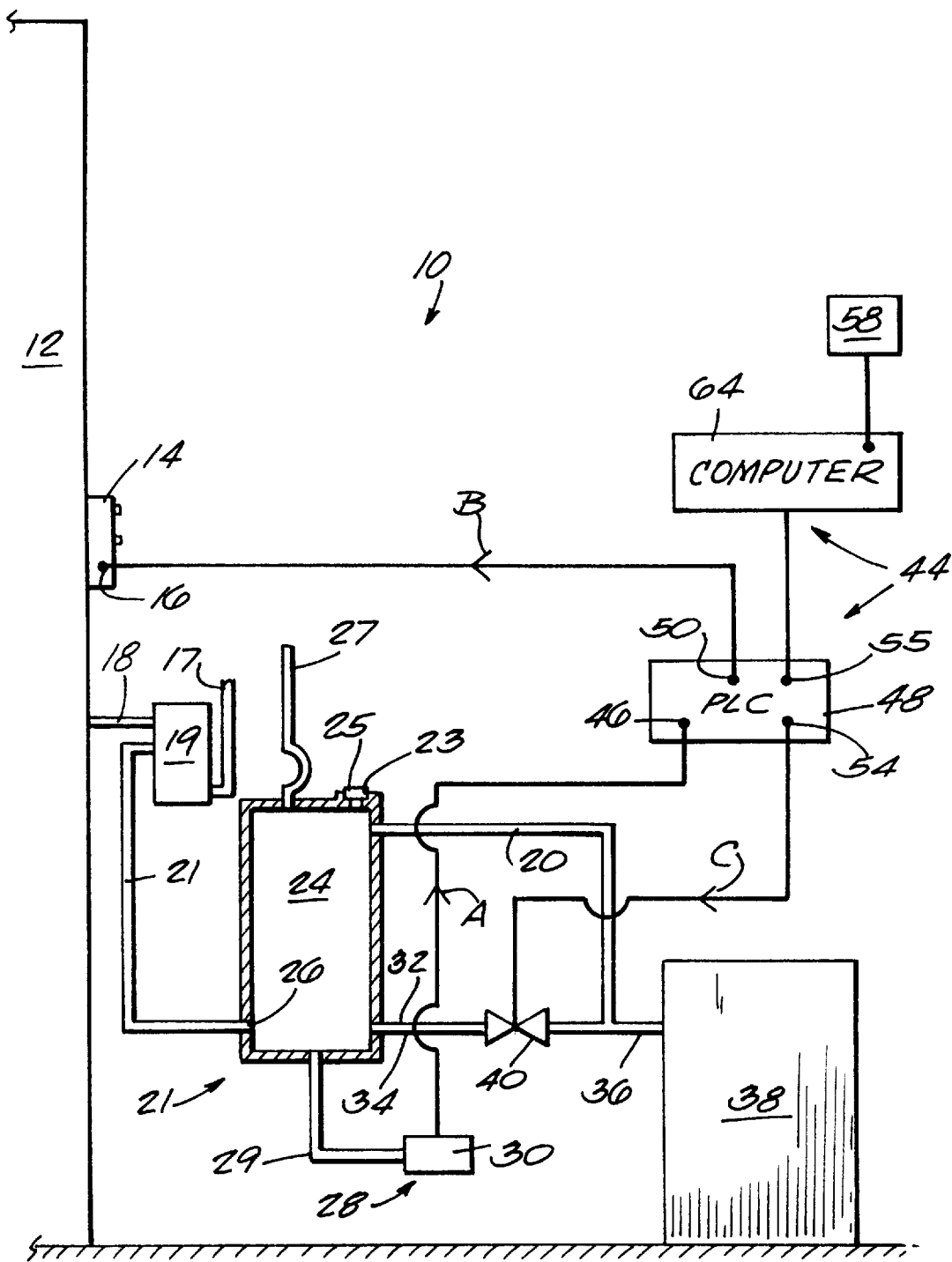

5,836,201

METHODS AND APPARATUS FOR MEASURING THE FLOW RATE OF SOLVENT RECOVERY IN SOLVENT RECOVERY DRYERS.

FIELD OF THE INVENTION

The present invention relates to solvent recovery dryers, and more particularly, to solvent recovery dryers having flow meters incorporated therein for performing a new method for monitoring the flow rate of solvent being recovered from the materials being dried in the solvent recovery dryers.

BACKGROUND PRIOR ART

Solvent recovery dryers are often used in industrial laundries, dry cleaners, and other applications where solvent is used and solvent recovery operations are being performed. Materials that have been washed in solvent, or that are otherwise saturated with or contain solvent, are dried in the solvent recovery dryers. The solvent recovery dryers evaporate the solvent from the materials being dried, and then recover the solvent by condensing it into liquid which is then fed through a solvent outlet and collected for reuse or proper disposal.

The recovery of solvent used in cleaning and other operations has become increasingly important. Environmental regulation has resulted in standards requiring mandatory recovery of solvents in certain operations. Some of these regulations require that a low level flow rate of solvent being recovered from a solvent recovery dryer be reached before the solvent recovery process is considered complete. For example, some current regulations for petroleum dry cleaners require that during the installation startup period of the drier, the flow rate of solvent being recovered by a solvent recovery dryer must be 50 ml/minute or less before the solvent recovery process is considered complete.

In addition to government regulation, it is cost beneficial to recover used solvent in many businesses. The solvent being recovered can be reused, thereby reducing the need to buy additional solvent. Furthermore, solvents recovered that are not reused can be disposed of correctly, thereby providing for a cleaner environment, and in many cases, an environmental and financial benefit for the company recovering the solvent. Additionally, environmental and financial benefits are available to the customer of such businesses. The recovered solvent volume can be quantified and used in customer reports.

To ensure that the environmental regulations are met, and that a consistent, documentable amount of solvent is recovered, a reliable and accurate method of measuring the flow rate of solvent emerging from the dryers is needed. However, continuously and accurately measuring and recording the flow rate of solvent being recovered from the solvent recovery dryers has proven to be a significant problem.

The standard method used in the dry cleaning and laundry industries to ensure that a minimum flow rate is reached is to calculate a "drying time" for a particular dryer. The drying time is the amount of time it takes for a particular dryer to run from the start of a drying cycle to the end of a drying cycle when drying a particular type of material. The end of the drying cycle occurs when the flow rate of solvent emerging from the dryer reaches the regulatory or otherwise chosen minimum flow rate.

Generally, the drying time is calculated by performing test runs over a several week period. During the test runs, the amount of time it takes for a dryer to reach the minimum flow rate is measured. To determine when the minimum flow rate is reached, the flow rate is monitored throughout each test run. The standard in the industry is to measure the flow rate by hand, wherein an operator uses a calibrated container, such as a beaker or graduated cylinder, to collect solvent flowing through a solvent outlet in the dryer for set time intervals. The operator then reads the amount of solvent collected in the calibrated container and calculates the flow rate. Once the minimum flow rate is reached, the drying time for a particular test run is known.

Duplicate tests are used to confirm the results, and then tests are run on different load variations, such as different sized loads, or different load materials. After several weeks of test runs are performed, a standard drying time can be chosen by reviewing the drying times from the test runs. Absent any obvious problems with the dryer, the drying time data produced from the test period is then used to calculate drying times for a particular dryer.

There are many problems with the standard method described above. First, the standard method is limited in the data it provides regarding each dryer run, and provides for poor documentation. It is difficult to perform research and development or to troubleshoot without adequate data. Additionally, shortened drying times are not allowed for, and smaller companies are burdened with increased labor needs. Next, the drying times are calculated based upon data that is produced only once a year over a short test period. This does not allow for continuous monitoring of solvent recovery throughout the year, and does not allow for necessary adjustments in the drying time of a particular dryer due to changes in the efficiency of the dryer, or other circumstances. Additionally, the standard method does not allow for the continuous monitoring of the flow rate of a dryer throughout the drying cycle. The element of human error is also present in measuring and calculating the drying time during the test runs.

Many problems arise if the calculated drying time is erroneous. If the drying time is too long, time and energy are wasted and there is an increased likelihood of fire or explosion. If the drying time is too short, resulting in the dryer being shut down prior to reaching the set minimum flow rate, many other problems arise. First, a significant amount of solvent may be lost during the shut-down period of a drying cycle. The shut-down period of most dryers includes a cool down stage. During the cool down stage the drying chamber of the dryer is open to the atmosphere. If a significant amount of solvent remains in the material being dried due to the erroneous drying time, then a significant amount of solvent will be lost to the atmosphere during cool down.

Additionally, significant time and energy is lost due to stopping a run prior to the material being dry because the run must be restarted, and reheated, once it is realized that further drying is necessary. If the load is delivered to a customer without realizing that the load is not dry, the load is often returned by the customer for redrying, thereby resulting in further lost solvent, time and energy.

Additionally, the standard method does not allow for easy adjustment of the drying time to change the final flow rate signifying the end of a run. If a different ending flow rate is desired or required by regulation, a new set of test runs must be performed to calculate the new drying time needed to reach the desired ending flow rate.

Other methods are known for measuring the flow rate of solvent flowing from a solvent recovery dryer, but have been largely ineffective. The solvent recovery dryers often require large sized solvent outlets due to the large initial flow rate of recovered solvent at the start of a drying cycle. However, the ending flow rate is generally very small. Due to the large outlet conduit, and the small ending flow rate, it is difficult to measure the ending flow rate using conventional flow rate measuring methods. Additionally, if orifices or weirs are used, any plugging of the meter by lint or other material will cause incorrect readings, and lint is often present in dry cleaning and laundry operations.

Standard low flow rate meters using other principles typically have high pressure drops and the typical dryers used are gravity drained and do not have the head available for these types of flow meters. Also, many flow meters are not accurate in measuring both high flow rates and low flow rates, and often it is desired during drying operations to measure the flow rates at the beginning of a drying run during the high flow rate period as well as at the end of a drying run during the low flow rate period.

Another problem in the art is that the solvent recovery dryers often have long drying times that may end at odd times or during non-traditional working hours. This problem results in the requirement that operators be present to stop the dryers at odd hours.

An additional problem is in providing for a simple and easy way of recording and storing records of solvent recovery data. Generally in the art, such records must be kept manually.

SUMMARY OF THE INVENTION

The invention includes a solvent recovery dryer having a flow sensing device in communication with the output of the solvent recovery dryer that overcomes problems with the prior art dryers. More particularly, the invention includes a flow sensing device that is in operable communication with a computer system, and the computer system includes means for calculating the flow rate of liquid flowing from the dryer and controlling the dryer when a set minimum flow rate has been reached. The computer system can display and store solvent recovery data, including the flow rates. The storage of the data by the computer system provides a convenient and easily reproducible record of solvent recovery for a particular dryer. The invention also provides a flow rate sensing apparatus that can be used with every run of a solvent recovery dryer, thereby providing for nearly continuous monitoring of solvent recovery to better ensure that solvent is being recovered and that environmental regulations are being met. The invention also provides for a flow sensing device that is accurate at measuring high flow rates as well as measuring low flow rates, and does not present a significant risk of clogging the liquid outlet path.

One embodiment of the invention includes a solvent recovery apparatus including a solvent recovery dryer for removing solvent from articles being processed. The solvent recovery dryer has a liquid outlet, and a flow sensing device that is in communication with the outlet. The flow sensing device has means for producing an output signal indicative of the flow rate of liquid through the liquid outlet. A computer system is in operable communication with the flow sensing device and the dryer. The computer system includes means for receiving the output signal from the flow sensing device, and for calculating the flow rate of liquid through the liquid outlet.

Another embodiment of the invention provides a container having an inlet in fluid communication with the liquid outlet for receiving liquid from the solvent recovery dryer. A sensor for producing a signal indicating the level of liquid in the container is also included. A computer system is in operable communication with the sensor and the dryer. The computer system includes means for receiving the signal from the sensor to determine the level of liquid in the container and means for computing the flow rate of liquid flowing through the outlet.

The invention also provides a method for measuring the flow rate of a liquid in a solvent recovery process including the steps of: removing liquid from articles being processed in a solvent recovery dryer, the solvent recovery dryer having a liquid outlet; discharging the liquid through the liquid outlet; measuring flow rate data of liquid flowing through the outlet using a flow sensing device, the flow sensing device being in communication with the outlet and having means for producing an output signal communicating flow rate data; delivering the output signal from the flow sensing device to a computer system in operable communication with the flow sensing device and the dryer, the computer including means for receiving the output signal from the flow sensing device at timed intervals and means for computing the flow rate of liquid flowing through the outlet; and computing in the computer the flow rate of liquid flowing through the outlet based upon the flow rate data.

Another embodiment of the invention provides a method of measuring the flow rate of a liquid in a solvent recovery apparatus including the steps of: discharging the liquid through the liquid outlet into a container in communication with the outlet; measuring the amount of liquid in the container at timed intervals with a sensor for producing an output signal indicating the level of liquid in the container; delivering the output signal at timed intervals from the sensor to a computer system in operable communication with the sensor and the dryer, the computer including means for receiving the signal from the sensor to determine the level of liquid in the container and means for computing the flow rate of liquid flowing through the outlet; and computing in the computer the flow rate of liquid flowing through the outlet.

One feature and advantage of the invention is that it provides for nearly continuous monitoring of the flow rate of solvent so as to better meet environmental regulations.

Another feature and advantage of the invention is that it provides for nearly continuous monitoring of the flow rate of solvent so as to optimize the amount of solvent recovered.

Another feature and advantage of the invention includes an increased accuracy level for measuring both high volume flow rates and low volume flow rates.

Another feature and advantage of the invention is that it provides for an automatic shift of the dryer into cool down stage once the set ending flow rate is reached, thereby reducing the need for an operator to be present when the dryer needs to be shifted into the cool down stage.

Another feature and advantage of the invention is that it prevents loss of solvent during cool down by delaying shifting of the dryer to the cool down stage until a set minimum flow rate is reached.

Another feature and advantage of the invention is that it prevents lost labor and energy cost due to premature shifting of dryers into cool down stage by not shifting the dryer into cool down until a set minimum flow rate is reached.

Another feature and advantage of the invention is that the ending flow rate, which determines when the solvent recovery dryer should be shifted into cool down, can be quickly and easily adjusted to different rates.

Another feature and advantage of the invention is that fewer loads will be returned for redry.

Another feature and advantage of the invention is that it allows for the nearly continuous monitoring of the progress and efficiency of a solvent recovery dryer during a drying cycle.

Another feature and advantage of the invention is the ability to monitor research and development activities, such as the one of new solvents, new materials, load variability, maintenance effects, or process enhancements or changes during the cycle runs.

Another feature and advantage of the invention is that it allows for the identification of problems, such as maintenance problems, temperature problems, drying time problems, and others, during the drying cycle.

Other features and advantages of the invention will become apparent to those skilled in the art upon review of the following detailed description, claims and drawings.

BRIEF DESCRIPTION OF THE DRAWINGS

FIG. 1 is a schematic view of a solvent recovery dryer embodying the present invention.

DETAILED DESCRIPTION OF ONE EMBODIMENT

Referring to FIG. 1, a solvent recovery apparatus 10 embodying the present invention is shown. The solvent recovery apparatus 10 includes a solvent recovery dryer 12 (partially shown in FIG. 1). A suitable solvent recovery dryer 12 is the "Petro Miser" marketed by Hoyt Corporation of Westport, Mass.

The solvent recovery dryer 12 includes a control panel 14 for controlling the operation of the dryer 12. The control panel 14 can be manually operated, but has an input port 16 such that it may receive control signals from an external source so as to be automatically operated. The control panel 14 is used to control, among other things, the start-up as well as the shut-down of the dryer 12.

The dryer 12 includes a liquid outlet 18 for discharging liquid recovered by the dryer 12. The outlet 18 is an elongated tube shaped conduit in fluid communication with the dryer 12. In other embodiments, the outlet 18 can be other shapes or sizes.

A water separator 19 is in fluid communication with the outlet 18, and acts to separate water from solvent present in the liquid output of the dryer 12. The water separator 19 has a water outlet conduit 17 and a solvent outlet conduit 21.

A flow sensing device 22 is in fluid communication with the solvent outlet 21. In other embodiments, the flow sensing device can be in fluid communication with the water outlet 17 for measuring the flow of water therefrom. In still other embodiments, the flow sensing device can be in fluid communication with the liquid outlet 18 for measuring the flow of the liquid from the dryer.

The flow sensing device 22 includes a calibrated container 24 having an inlet 26 in fluid communication with the solvent outlet 21 for receiving solvent from the dryer 12 in the interior of the container 24. The container 24 is constructed of a rigid material that is generally resistant to solvent. Many metals, fiberglass, and many rigid plastics are suitable materials. The container 24 further includes a threaded bore 23 in the top of thereof to allow access to the interior of the container for maintenance, cleaning purposes and calibration. A threaded plug 25 fits into the bore 25 to substantially close the bore during normal operation of the apparatus 10.

A vent conduit 27 is connected to the top of the container 24, and is in fluid communication with the interior of the container 24 such that air may escape the container 24 through the vent conduit 27 as the container 24 is filled with a liquid. An overflow outlet conduit 20, is in fluid communication with the top of the container 24, and extends to and is in fluid communication with a second end 36 of a drain conduit 32. The bypass conduit 20 acts as a backup conduit through which liquid may flow if the drain conduit 32 becomes clogged or inoperable.

The flow sensing device 22 also includes a sensor 28 for sensing the amount/level of liquid in the container 24. The sensor 28 is a pressure transducer 30 located at the bottom of the container 24 that is in fluid communication with the container via tubing 29. In other embodiments, the sensor 28 can be a float, a scale, limit switches, or any other device known for sensing the amount/level of a liquid in a container. The sensor 28 produces output signals indicating the amount/level of liquid in the container 24 at timed intervals.

A drain conduit 32 is in fluid communication with the container 24 for emptying solvent from the container 24. One end 34 of the conduit 32 is connected to and in fluid communication with the container 24, and another end 36 of the conduit 32 is connected to and is in fluid communication with a collecting tank 38. The collecting tank 38 is a large tank for receiving and storing solvent recovered from the dryer 12.

A valve 40 is situated within the drain conduit 32. The valve 40 is selectively movable between a first position to block the flow of solvent through the drain conduit 32 and a second position to allow the flow of solvent through the drain conduit 32. In other embodiments, other valves known in the art may be used. Generally, it is preferable that the valve 40 be a large valve with a large orifice to prevent plugging of the drain conduit 32.

The flow sensing device 22 is in operable communication with a computer system 44. The computer system 44 includes a programmable logic controller 48 or "PLC" 48 and a computer 64. The PLC 48 has an input port 46 for receiving output signals (A) from the sensor 28.

The PLC 48 has a first control signal output port 50 in operable communication with the input port 16 of the control panel 14 for producing a control signal (B) to manipulate the shifting of the dryer into the cool down stage. The PLC 48 also includes a second control signal output port 54 in operable communication with the valve 40 to manipulate the valve 40 between the first and second positions with output signals (C). The PLC 48 additionally includes a third signal output port 55 that is in operable communication with the computer 64.

The computer 64 includes a data conveying means 58. The data conveying means 58 is a device generally known for conveying data from a computer such that it can be understood by an operator. Such devices as video monitors, printers, and others generally known may function as the data conveying means 58.

The computer 64 includes means for storing data such that the calculated flow rates can be stored for later reference. Such storage structure may include random access memory, hard disk drives having hard disks, floppy disk drives with floppy disks or other generally known devices and structure for storing data in a computer.

The computer system 44 includes software and hardware allowing for the reception of output signals (A) from the flow meter, and for the calculation of the flow rate of solvent in the solvent output 21 based upon the output signals (A) over a timed period. The software programs further allow for storage of data in the computer system 44 and for the conveyance of data such that the calculated flow rates can be conveyed to an operator via the data conveying means 58. The software programs also allow for a minimum flow rate to be entered into the computer system 44 by an operator and stored by the computer system 44. The software programs further allow for the generation of output signals (B) to the control panel 14 of the dryer 12 to control the dryer 12 when the minimum flow rate has been reached.

In other embodiments, the computer system 44 may include only a PLC 48, or alternatively, only a computer 64. A PLC alone could be configured to perform the necessary functions of running the apparatus. Likewise, a computer alone could be configured to perform the necessary functions for running the apparatus.

One software and hardware arrangement suitable for use in the current invention includes a "Fanuc" programmable logic controller model 90-30 marketed by General Electric programmed with "Ladder Logic", and an IBM compatible PC having a suitable software program for displaying flow rate data such as "Wonder Ware" marketed by Wonder Ware Corporation.

The invention also provides for a method for measuring the flow rate in the solvent recovery apparatus. Operation of the apparatus 10 is initiated by an operator who starts the dryer 12. The dryer 12 then begins removing liquid, including solvent, from articles being processed and recovering the liquid through condensation. The dryer 12 discharges the recovered liquid through the liquid outlet 18. The liquid flows, by gravity, through the outlet 18 and into the water separator 19. Separated solvent then exits the water separator 19, flows through the solvent outlet 21 and into the container 24. At timed intervals, the amount of solvent in the container 24 is measured with the sensor 28. The pressure transducer 30 measures the amount of solvent in the container 24 and produces output signals (A) at timed intervals indicating the level of fluid in the container 24, and the output signals (A) are delivered to the input port 46 of the PLC 48. The PLC 48 receives the signal (A) and determines the level of solvent in the container 24 at set times. The PLC 48 then computes the flow rate of solvent flowing through the outlet 21, and simultaneously conveys the flow rate data to the computer 64 which conveys the data to an operator via a monitor or a printer 58. The computer 64 also simultaneously stores the flow rate data on a hard disk or other known storage means.

During normal operation, the valve 40 is maintained in the first, blocking position such that solvent cannot flow through the drain conduit 32, and is held in the container 24. A pressure limit is set within the PLC 48 that triggers the PLC 48 to empty the container 24 via actuation of valve 40. When the PLC 48 perceives that the pressure limit is met, the PLC 48 produces a control signal (C) to open the valve 40 to empty the container 24. The control signal (C) manipulates the valve 40 such that the valve 40 is put into the second position thereby allowing the solvent to drain from the container 24 through the drain conduit 32, and into the collecting tank 38. When the PLC 48 perceives that the container 24 has been emptied, the PLC 48 produces a control signal (C) to manipulate the valve 40 back into the first position, such that solvent cannot flow through the drain conduit 32.

The PLC 48 continues to receive signals, and calculate flow rates during a dryer run until a set minimum flow rate is reached. When the set minimum flow rate is reached, the PLC 48 produces a control signal (B) to shift the dryer 12 into cool down stage. The control signal (B) is sent from output port 50 to the input port 16. PLC simultaneously sends flow rate data to the computer 64, which simultaneously stores the flow rate data and the drying time data within the storage means.

It is to be understood that the invention is not limited in its application to the details of the construction and the arrangements of components set forth in the above description or illustrated in the drawings. The invention is capable of other embodiments and of being practiced or being carried out in various ways. Also, it is understood that the phraseology and terminology used herein is for the purpose of description and should not be regarded as limiting.

Various features of the invention are set forth in the following claims.

We claim:

1. A solvent recovery apparatus comprising:
    a solvent recovery dryer for removing solvent from articles being processed, the solvent recovery dryer having a liquid outlet;
    a container having an inlet, wherein said inlet is in fluid communication with the liquid outlet for receiving liquid from the solvent recovery dryer;
    a sensor for producing a signal indicating the level of liquid in the container; and
    a computer system in operable communication with said sensor and said dryer, the computer system including means for receiving the signal from the sensor to determine the level of liquid in the container and means for computing the flow rate of liquid flowing through the liquid outlet of the solvent recovery dryer by determining the level of liquid in the container from the solvent recovery dryer at timed intervals.

2. The solvent recovery apparatus of claim 1, wherein the computer system further includes means for controlling the solvent recovery dryer when the calculated flow rate reaches a predetermined value.

3. The solvent recovery apparatus of claim 1, wherein the computer system further includes means for storing flow rate data.

4. The solvent recovery apparatus of claim 1 wherein the container further includes an outlet conduit in fluid communication with the container and a valve situated within said outlet conduit, said valve being selectively movable between a first position to block the flow of liquid through the outlet conduit and a second position to allow the flow of liquid through the outlet conduit.

5. The solvent recovery apparatus of claim 4 wherein said valve is in operable communication with said computer system and said computer system further includes means for actuating said valve to allow liquid to flow through the outlet conduit to substantially empty said container of liquid.

6. A solvent recovery apparatus comprising:
    a solvent recovery dryer for removing solvent from articles being cleaned, the solvent recovery dryer having a liquid outlet;
    a flow sensing device in communication with the outlet and having means for producing an output signal indicative of a flow rate data of liquid through the liquid outlet;
    a computer system in operable communication with said flow sensing device and said dryer, the computer system including means for receiving the output signal from the flow sensing device at timed intervals and means for computing the flow rate of liquid flowing through the outlet of the solvent recovery dryer based on the flow rate data.

7. The solvent recovery apparatus of claim 6, wherein the computer system further includes means for controlling the solvent recovery dryer when the flow rate reaches a predetermined value.

8. The solvent recovery apparatus of claim 6, wherein the computer further includes means for storing flow rate data.

9. The solvent recovery apparatus of claim 6 wherein the flow sensing device includes:
- a container having an inlet, wherein said inlet is in fluid communication with the liquid outlet for receiving liquid from the solvent recovery dryer; and
- a sensor in operable communication with said computer for producing an output signal indicating the level of liquid in the container.

10. The solvent recovery apparatus of claim 9, wherein the container further includes an outlet conduit in fluid communication with the container and a valve shiftable within said outlet conduit, said valve being selectively movable between a first position to block the flow of liquid through the outlet conduit and a second position to allow the flow of liquid through the outlet conduit.

11. The solvent recovery apparatus of claim 10 wherein said valve is in operable communication with said computer system and said computer system further includes means for actuating said valve to allow liquid to flow through the outlet conduit to substantially empty said container of liquid.

12. A method of measuring flow rate of a liquid in a solvent recovery apparatus comprising:
- removing liquid from articles being dried in a solvent recovery dryer having a liquid outlet;
- discharging the liquid through the liquid outlet into a container in communication with the outlet of the solvent recovery dryer;
- measuring the amount of liquid in the container at timed intervals with a sensor for producing an output signal indicating the level of liquid in the container;
- delivering the output signal at timed intervals from the sensor to a computer system in operable communication with the sensor and the dryer, the computer system including means for receiving the signal from the sensor to determine the level of liquid of in the container and means for computing the flow rate of liquid flowing through the outlet of the solvent recovery dryer; and
- computing in the computer the flow rate of liquid flowing through the outlet by determining the level of liquid in the container from the solvent recovery dryer at timed intervals.

13. The method of claim 12 further including the step of controlling the solvent recovery apparatus when the computed flow rate reaches a predetermined value.

14. The method of claim 12 further including the steps of calculating flow rates over time to produce flow rate information and storing the flow rate information in the computer.

15. The method of claim 12 wherein the sensor includes a pressure transducer in fluid communication with the container, and wherein the step of measuring the amount of liquid includes determining the amount of pressure on the pressure transducer.

16. The method of claim 12 further including the step of emptying the container.

17. A method for measuring flow rate of a liquid in a solvent recovery process comprising the steps of:
- removing liquid from articles being dried in a solvent recovery dryer, the solvent recovery dryer having a liquid outlet;
- discharging the liquid through the liquid outlet of the solvent recovery dryer;
- measuring flow rate data of liquid flowing through the outlet of the solvent recovery dryer using a flow sensing device, the flow sensing device being in communication with the outlet and having means for producing an output signal communicating flow rate data;
- delivering the output signal from the flow sensing device to a computer system in operable communication with said flow sensing device and said dryer, the computer system including means for receiving the output signal from the flow sensing device at timed intervals and means for computing the flow rate of liquid flowing through the outlet of the solvent recovery dryer; and
- computing in the computer system the flow rate of liquid flowing through the outlet of the solvent recovery dryer based upon the flow rate data.

18. The method of claim 17 further providing that the computer includes means for producing an output signal to the dryer to control the dryer and further including the step of controlling the dryer when the flow rate reaches a predetermined value.

19. The method of claim 17 further including the steps of calculating flow rates over time to produce flow rate information and storing the flow rate information in the computer.

20. The method of claim 17 wherein the flow sensing device includes:
- a container having an inlet, wherein said inlet is in fluid communication with the liquid outlet for receiving liquid from the solvent recovery dryer, and a sensor in operable communication with said computer for producing an output signal indicating the level of liquid in the container, and wherein the step of measuring includes determining the level of liquid in the container at timed intervals.

21. The method of claim 20 further includes the step of emptying the container.

* * * * *